March 17 1925.
J. A. SIRNIT
PENSTOCK GATE
Filed April 17, 1923   2 Sheets-Sheet 2
1,529,966
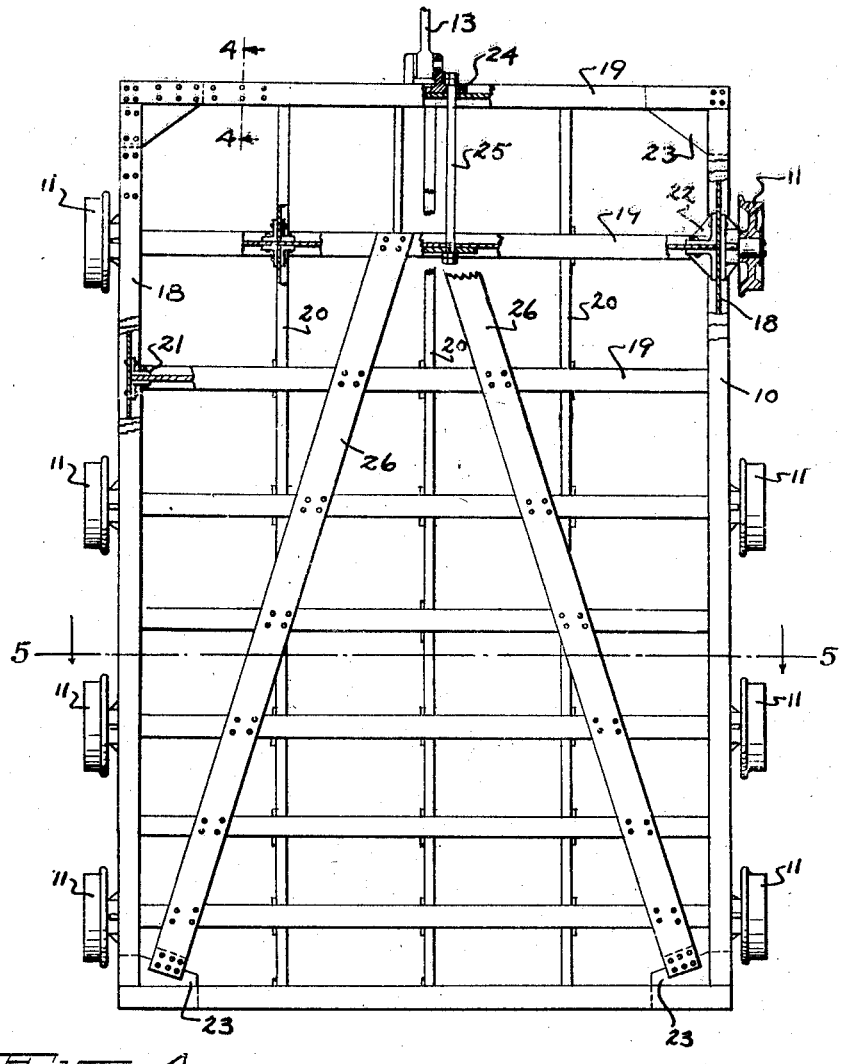
INVENTOR
John A. Sirnit
BY
ATTORNEY Patented Mar. 17, 1925.

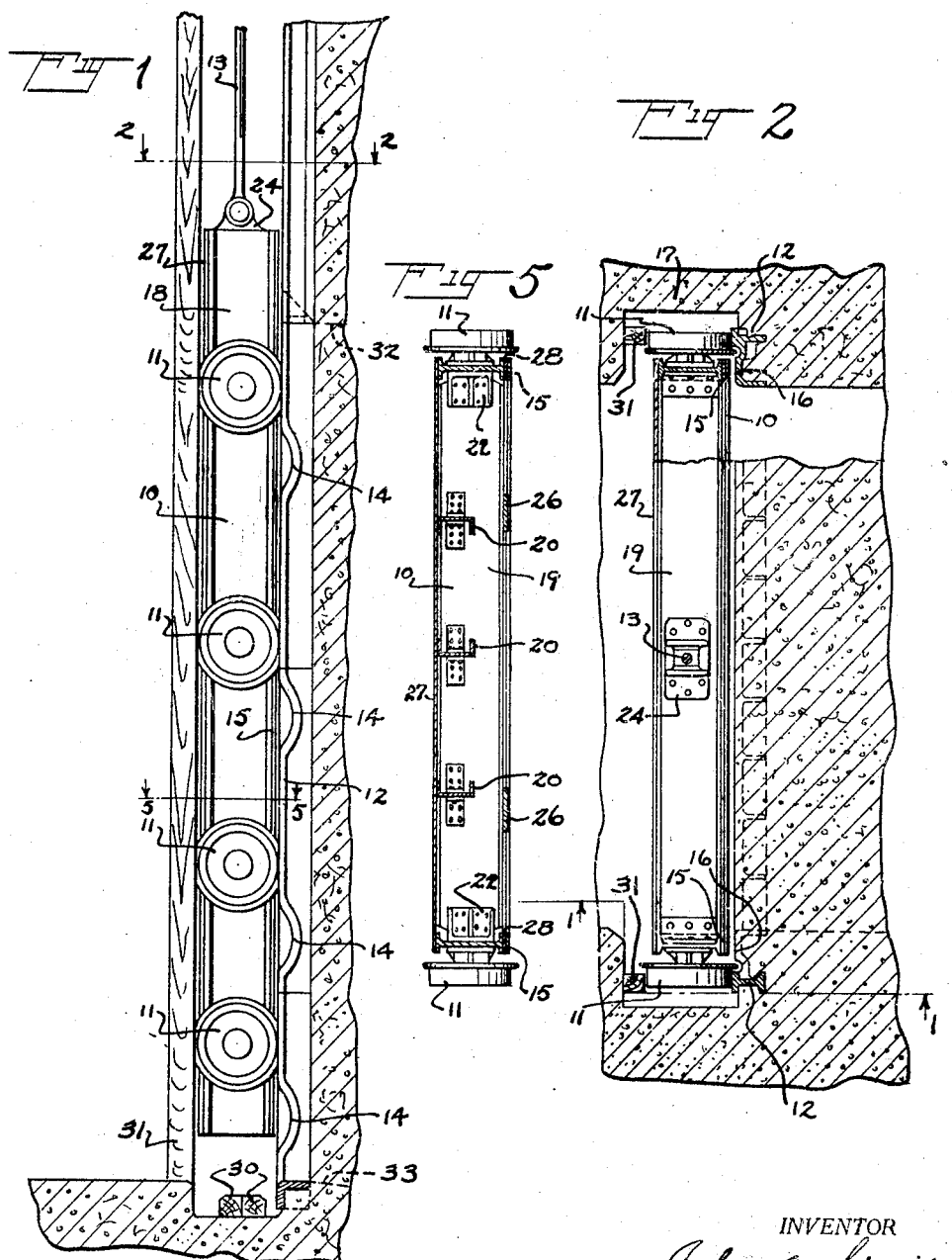

1,529,966

UNITED STATES PATENT OFFICE.

JOHN A. SIRNIT, OF BIRMINGHAM, ALABAMA, ASSIGNOR TO M. H. TREADWELL COMPANY, OF NEW YORK, N. Y., A CORPORATION OF NEW YORK.

PENSTOCK GATE.

Application filed April 17, 1923. Serial No. 632,695.

*To all whom it may concern:*

Be it known that I, JOHN A. SIRNIT, a citizen of the United States, and a resident of Birmingham, in the county of Jefferson and State of Alabama, have invented certain new and useful Improvements in Penstock Gates, of which the following is a specification.

This invention relates to penstock gates having rollers traveling on a track wherein notches receive the rollers when the gate is closed to enable the gate to seat tightly. The object of this invention is to provide an arrangement of rollers and track whereby when the gate is not in seated position it will travel smoothly up and down the track without being interfered with by the rollers falling into one or more of the notches.

In a gate having two rollers on a side and traveling along a track provided with two notches on a side, on closing the gate or lowering it the lower end of the gate will fall into the upper notch, and similarly in raising the gate the lower end again falls into the upper notch. In either case smooth operation is prevented and jamming may occur.

According to this invention, spaced rollers are provided for the support of each end of the gate and also one or more unequally spaced intermediate rollers. The track is provided with corresponding unequally spaced notches to receive the rollers in closed position of the gate and enable it to be tightly closed on the stationary seat. In this invention the plane of the gate, or of the seating surface of the gate, is always maintained parallel to its stationary seat without the gate at any time being permitted to cant and thereby jam or damage the stationary seat.

Large hydraulic gates usually have a frame built of I-beams which if planed to fit the stationary seat before attaching a soft metal seating strip, may objectionably weaken a flange on some of the I-beams, or may require a new frame being made. To avoid this objection, I apply a strip to the I-beam in the nature of a shim of sufficient thickness to enable the strip to be planed, after which the soft metal seating strip is attached to the shim, thus obviating the weakening of the I-beam flanges or the necessity of making a new frame.

Referring to the drawings:

Figure 1 is a side view of the gate taken on the line 1—1 of Fig. 2.

Fig. 2 is a top view of the gate.

Fig. 3 is a plan view, partly in section, showing the construction of the frame.

Fig. 4 is a section on the line 4—4 of Fig. 3.

Fig. 5 is a section on the line 5—5 of Fig. 1.

A gate 10 is mounted on the rollers 11, which ride on the track 12 as the gate is pulled up and down by the suspension member 13 to reduce friction under the unbalanced pressure on the left side of the gate shown in Fig. 1. It will be noticed that the rollers 11 are no two of them spaced the same distance apart. The track 12 is provided with a plurality of notches 14 in which the rollers are moved when the gate is in its lowermost position and when the pressure on the gate is taken off said rollers. In closed position of the gate the soft metal seating strips 15, which preferably extend around the edges of all four sides of the gate, rest upon the stationary seat 16 around the penstock or other passageway. The faces of the seat 16 which cooperate with the strips 15 may be planed and are preferably embedded in concrete 17, or other appropriate foundation. The wooden strips 30 are used to sustain the weight of the gate in its lowered position so that the iron framework will not cut into the concrete at the bottom of the gate slide. The vertically extending wooden members 31 help retain the gate in position in event that there should for any reason be any tendency for the rollers to be moved off the track 12. As the gate is moved upward, no more than one roller at a time can be over one of the notches 14 due to the unequal spacing of the rollers, and in this manner the gate is given a uniform path of movement without having any of the rollers move into one or more of the notches 14 except when the gate is in its lowermost position, since at other times there will be several rollers on a side effective to hold the gate in proper alignment. The roller next to the topmost may be left out if desired when the gate is similarly operable on the three rollers of each side.

The gate 10 has a frame which comprises longitudinally extending I-beams 18 on the outside edges between which extend a plurality of I-beams 19 for cross-bracing the frame. Additional longitudinal bracing is supplied by the channel members 20. Angle brackets 21 are riveted to the longitudinal and cross beams. Where the wheels are secured to the longitudinal beams, larger brackets 22 may be used and at the corners gusset plates 23 provide additional strength. The suspension member 13 is pivotally secured to the lifting member 24, which comprises the bolts 25 extending through from the first to the second cross beams 19 at the top of the gate. From the bolts 25 the stresses are distributed uniformly to the cross beams 19 by means of diagonally disposed plates 26 riveted to each of the cross beams 19 below the topmost and extending to the gusset plates 23 in the lower corners of the frame. While the diagonal braces 26 have been illustrated as being arranged upon only one side of the frame, as shown in Fig. 5, it will be seen that these braces may, if desired, be arranged upon both sides of the cross beams 19. As a sheathing for the frame, a substantial metal plate 27 is riveted to one side as shown in Figs. 1, 2 and 5. If the seating strips 15 be secured directly to the flanges of the I-beams around the edges of the gate, the strips may not fit properly at all points on the stationary frame 16. To properly seat these strips all the way around the flanges of the I-beams cannot safely be planed down without reducing their strength and to overcome these difficulties, long shims 28, preferably of steel, are riveted or bolted to the flange of the I-beams 19, as shown in Fig. 4, by the use of rivets or bolts having countersunk heads so that the outer face of strip 28 may be machined down as desired. Upon completion of the planing operation, the strips 15 are also secured by rivets or bolts having countersunk heads in order that these may properly fit against the face of the stationary seat 16 to render leakage as small as possible. The top and bottom of the penstock passageway is indicated in Fig. 1 by the dotted lines 32 and 33, respectively.

In operation the gate moves smoothly on its rollers throughout its entire path until the lowermost position is reached, when the rollers move into the notches 14 and allow the gate to close with the strips 15 firmly resting on the face 16 of the stationary seat. With the faces of the frame 16 and machined strips 15 together and the pressure on the left side of the gate, as shown in Figs. 1 and 2, leakage is obviated with the gate closed. A little additional tension on the suspension member 13 is required to pull the rollers out of the notches and raise the gate off the seat 16 under the pressure on the outside of the gate, but when once started on its upward movement, considerable less effort is required since the rollers move along the track 12 and friction is reduced to a minimum. The unequal spacing of the rollers prevents more than one of them at a time being over a notch 14, at which time the rest of the rollers keep the gate properly positioned without allowing any portion of it to cooperate with the seat 16. It will be seen that at all times the plane of the gate is parallel to the plane of its seat.

I claim:

1. The combination with a stationary seat of a sliding gate mounted on rollers, a track along which the gate travels having notches for the rollers to seat the gate in closed position, said rollers and notches being so disposed as to maintain the plane of the gate parallel to its seat in any position.

2. The combination with a slidable gate having at least three unequally spaced supporting rollers on each side, of a seat, a track for the rollers provided with correspondingly spaced notches therein permitting the gate to be seated in closed position with pressure off the rollers, and mechanism for operating said gate.

3. The combination with a hydraulic gate mounted on rollers, of a seat for the gate, a track along which the gate is adapted to smoothly travel with the plane of the gate parallel to itself and to the plane of its seat in all positions, and means for seating the gate with the pressure off said rollers.

4. A hydraulic gate mounted on rollers and having a frame built up of flanged steel beams, a stationary seat against which the gate is adapted to be moved, means for moving the gate onto said seat with the pressure off the rollers, a long shim secured to at least one of said beams and adapted to be planed for cooperation with said seat, and a soft metal seating strip intermediate the seat and shim and secured to the latter.

5. The combination with a hydraulic gate mounted on rollers and having a frame of structural steel beams longitudinally arranged, other beams cross-bracing said longitudinal beams, a lifting member at the top central portion of the gate, a plurality of diagonal bracing members extending from adjacent the lifting member toward the lower corners of the frame, and adapted to distribute the lifting stresses among the bracing beams, a seat for the gate, a track along which the gate is adapted to smoothly travel with the plane of the gate parallel to itself in all positions, a portion of the track being shaped to take the pressure off the rollers when the gate is closed, and means for operating the gate.

Signed at Birmingham, in the county of Jefferson and State of Alabama, this 9th day of April A. D. 1923.

JOHN A. SIRNIT.